United States Patent
Braun et al.

(10) Patent No.: US 10,052,570 B2
(45) Date of Patent: Aug. 21, 2018

(54) SETTLING BASIN INSERT

(71) Applicant: CB SHIELD INC., Oakville (CA)

(72) Inventors: Stephen Braun, Oakville (CA); Hal Stratford, Brantford (CA)

(73) Assignee: CB SHIELD INC., Oakville (CA)

( * ) Notice: Subject to any disclaimer, the term of this patent is extended or adjusted under 35 U.S.C. 154(b) by 45 days.

(21) Appl. No.: 15/400,090

(22) Filed: Jan. 6, 2017

(65) Prior Publication Data

US 2018/0193772 A1 Jul. 12, 2018

(51) Int. Cl.
*B01D 21/24* (2006.01)
*E03F 3/04* (2006.01)
*B01D 21/00* (2006.01)

(52) U.S. Cl.
CPC ....... *B01D 21/2405* (2013.01); *B01D 21/003* (2013.01); *B01D 21/2483* (2013.01); *E03F 3/046* (2013.01)

(58) Field of Classification Search
CPC .............. B01D 21/003; B01D 21/0087; B01D 21/2405; B01D 21/2483; E03F 3/046; E03F 5/0403; E02B 5/08; E02B 8/023
USPC .... 210/747.1, 747.9, 800, 801, 162, 170.01, 210/519, 532.1
See application file for complete search history.

(56) References Cited

U.S. PATENT DOCUMENTS

| | | | |
|---|---|---|---|
| 2,961,100 A * | 11/1960 | Katz | B01D 21/24 210/519 |
| 5,558,780 A * | 9/1996 | Vancas | B01D 21/2405 210/801 |
| 6,379,541 B1 | 4/2002 | Nicholas | |
| 7,226,242 B2 * | 6/2007 | LeBuffe | E02B 8/02 210/170.01 |
| 7,294,256 B2 | 11/2007 | Happel et al. | |
| 7,686,956 B1 | 3/2010 | Casebier | |
| 8,529,756 B2 * | 9/2013 | Lehman | B01D 21/24 210/532.1 |
| 2010/0061805 A1 * | 3/2010 | Nourian | E03F 3/046 405/36 |
| 2012/0217205 A1 * | 8/2012 | Lord | E03F 5/0403 210/170.03 |
| 2014/0116967 A1 * | 5/2014 | Smith | B01D 21/003 210/800 |

FOREIGN PATENT DOCUMENTS

DE 10136161 * 2/2003
DE 202012007028 * 12/2013

* cited by examiner

*Primary Examiner* — Christopher Upton

(57) ABSTRACT

A settling basin insert for controlling fluid flow into a settling basin has a first and second side wall in opposition, and a top surface extending between the first and second side walls, defining a sump extending from head to end. Fluid apertures extend through the top surface to permit fluid to communicate with the sump and an access aperture in the top surface permits a vacuum hose to pass into the sump. The first side wall is taller than the second side wall, and the first and second side walls each define a guide wall extending above the top surface. The second side wall is configured to be adjacent the settling basin. The first and second side walls direct inflowing fluid along the settling basin insert and through the fluid apertures in the top surface, decelerating the fluid for settling of sediment in the settling basin insert.

11 Claims, 10 Drawing Sheets

SETTLING BASIN INSERT

TECHNICAL FIELD

This relates to settling basins, and in particular, to devices and methods for controlling flow and quality of fluid, for example storm water, into a settling basin.

BACKGROUND

Settling basins typically use sedimentation to remove suspended solids from fluid using gravity. Settling basins may be formed of a structure such as concrete, or an earthen structure, for example a settling pond.

Settling basins may collect inflowing fluid such as storm water or waste water through an inlet. Inflowing fluid may carry suspended solid particles that may include dirt, sand, litter, or other waste. As the inflowing fluid enters the basin, particles in the fluid are separated by gravity and particles settle to the bottom of the basin to form sediment. The fluid is retained in the basin for a settling time that allows the desired particle size to be separated. Smaller particles may require longer settling time or larger volume basins, as smaller particles have a smaller settling velocity, defined as the terminal velocity reached by a particle as it falls through a fluid.

Following settling, water may outflow from the settling basin at an outlet or overflow points.

Settling within the basin may be affected by turbulence in the water. Turbulence may be caused, for example, by wind, geometry of the basin, inlet design and outlet or overflow design.

High flow rate or fast-flowing inflowing fluid may agitate settled sediment in conventional settling basins, for example, in periods of increased flow rate or volume of inflowing fluid, a storm event or periods of heavy rainfall intensity.

Using traditional maintenance methods, an entire settling basin may be drained to allow sediment that has settled on the bottom of the basin to be removed manually or using a machine such as a mechanical loader or crane, or a vacuum truck.

Accordingly, there is a need for improved collection and removal of sediment collected from inflowing fluid.

SUMMARY

According to an aspect, there is provided a settling basin insert for controlling fluid flow into a settling basin, the settling basin insert comprising: a first side wall and a second side wall in opposition, and a top surface extending between the first side wall and the second side wall, the first side wall, the second side wall and the top surface defining a sump extending from a head to an end; and a plurality of fluid apertures extending through the top surface to permit fluid to communicate with the sump therethrough and an access aperture in the top surface to permit a vacuum hose to pass into the sump; wherein the first side wall is taller than the second side wall, and the first side wall and the second side wall each define a guide wall extending above the top surface, and the second side wall is configured to be adjacent the settling basin.

According to another aspect, there is provided a method of controlling fluid flow into a settling basin, comprising: directing fluid towards a head of a settling basin insert at approximately a permanent water level of the settling basin; directing fluid over flow dispersion protrusions, thereby decelerating the fluid; diverting fluid from passing into the settling basin by directing fluid along the settling basin insert by a first guide wall adjacent the settling basin and extending above approximately the permanent water level of the settling basin, and an opposing second guide wall adjacent land and extending above approximately the permanent water level of the settling basin to a height greater than a height of the first guide wall; and directing fluid through apertures along a surface of the settling basin insert to further decelerate the fluid for settling of sediment in the settling basin insert.

Other features will become apparent from the drawings in conjunction with the following description.

BRIEF DESCRIPTION OF THE DRAWINGS

In the figures which illustrate example embodiments.

DETAILED DESCRIPTION

Figure 1:
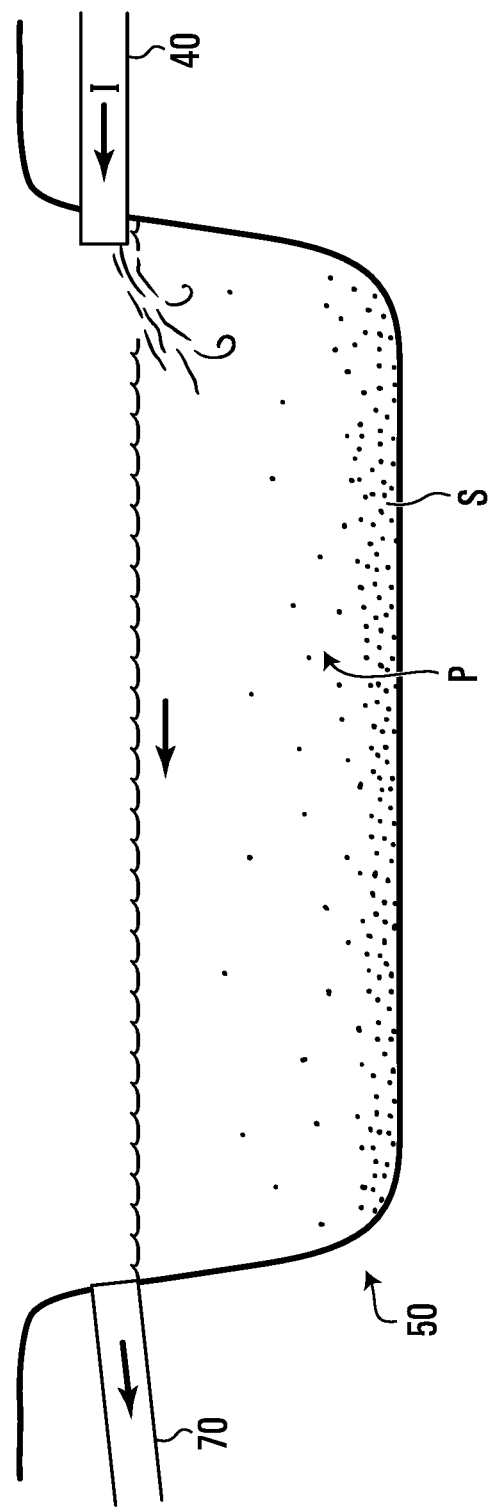
FIG. 1 is a diagram of fluid flow in a settling pond.

FIG. 1 depicts a typical settling basin, such as a settling pond 50. Settling pond 50 is formed of an earthen structure having slopes descending from a shoreline at ground level to a bottom. Inflowing fluid I, such as waste water, may flow through inlet 40 into settling pond 50. Fluid I may carry solid particles, for example dirt, sand, litter, or other waste. As used herein, unless otherwise specified, references to "fluid" or "fluid flow" may also include any entrained solid particles. Fluid accumulates in pool P in settling pond 50 until the level of pool P reaches outlet 70. Thereafter, further fluid flowing into settling pond 50 causes fluid to be displaced out of settling pond 50 through outlet 70, for example, into further components of a water treatment system.

Fluid generally resides in pool P in settling pond 50 until it is displaced through outlet 70 or until it evaporates. Thus, fluid typically resides in P for a period of time which may be proportional to the rate at which fluid flows into settling pond 50. When fluid I flows slowly or intermittently, pool P may be relatively still, which may allow sediment S to settle to the bottom of settling pond 50, rather than being carried with outflowing fluid. Accumulated sediment S may periodically be removed (e.g. manually or using a machine) and disposed of. Removal of sediment S from the bottom of settling pond 50 may require drainage of the fluid in pool P from pond 50.

Events such as periods of increased volume of inflowing fluid, a storm event or periods of heavy rainfall intensity may cause inflowing fluid I to rush into settling pond 50 at a high velocity or flow rate. In some cases, incoming fluid at high flow rate or velocity may agitate pool P and promote mixing of previously-settled sediment S, which may ultimately lead to sediment being carried out of pond 50. Moreover, the flow of incoming fluid may exit more quickly through outlet 70, rather than residing in pond 50 for a significant period of time. Accordingly, incoming solid particles may not have an opportunity to settle and may simply be carried out of pond 50.

Figure 2:
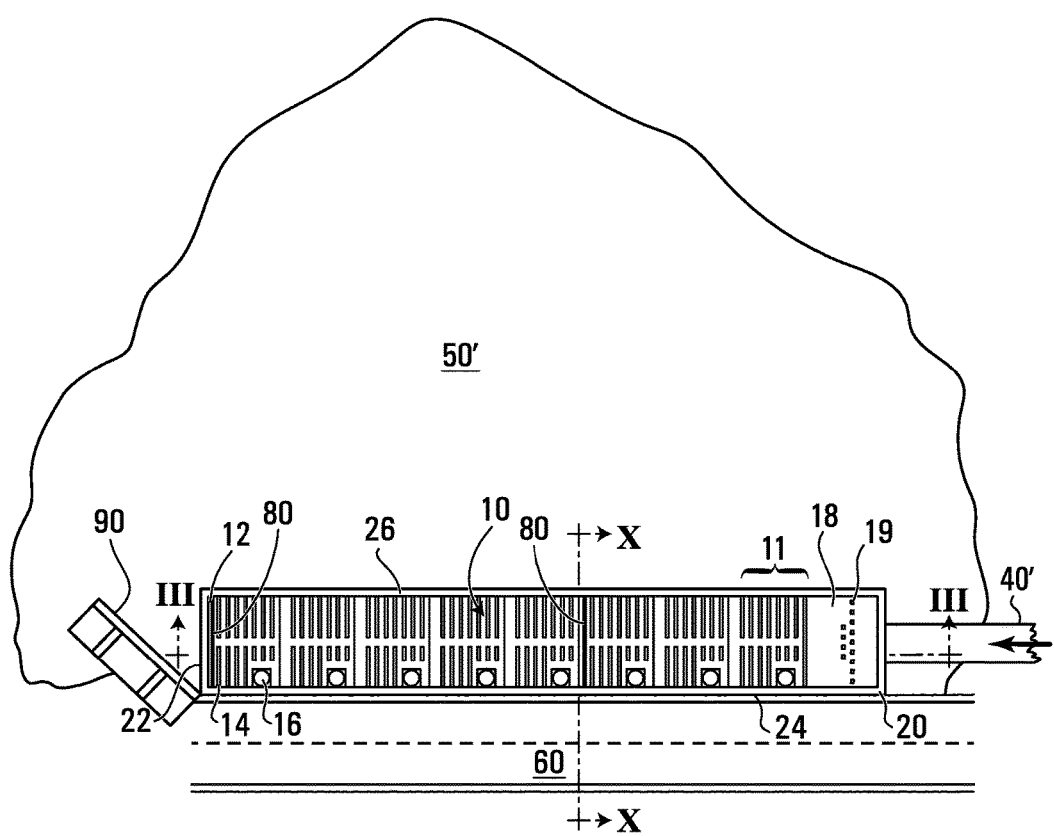
FIG. 2 is a top plan view of an example settling basin insert, installed adjacent to a settling pond.

Accordingly, deceleration of fluid flow and diversion of fast-flowing fluid to a preliminary location such as a settling basin insert 10, as illustrated in FIG. 2, before it enters a settling basin such as a settling pond 50' may tend to promote settling and retention of at least some sediment in settling basin insert 10 before fluid enters pond 50', allowing for planned removal and disposal thereof.

Figure 3:
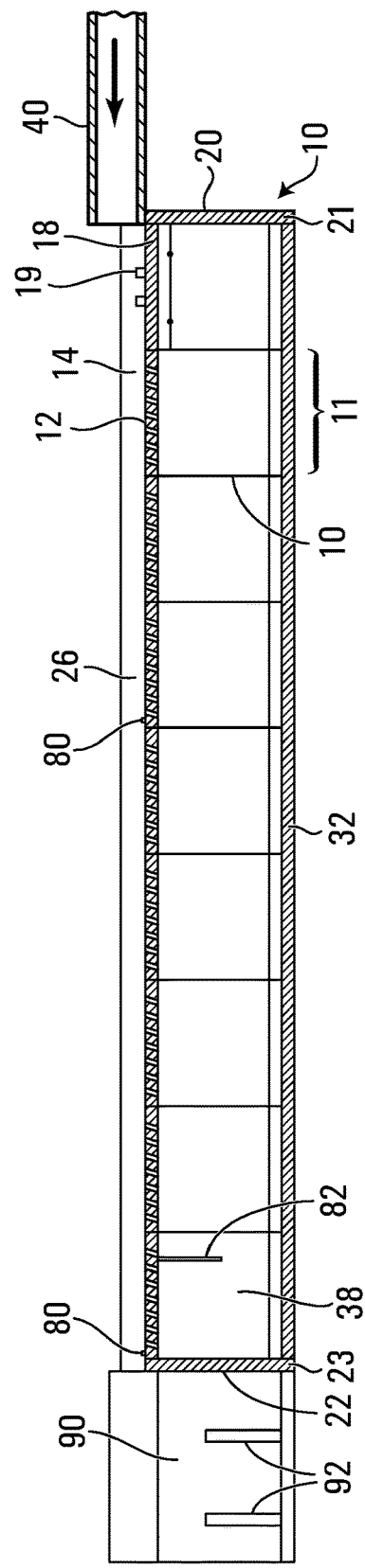
FIG. 3 is a cross-sectional view of the settling basin insert of FIG. 2 along lines III-III.

FIG. 2 is a top plan view of settling basin insert 10 installed adjacent to, or near an edge of, settling pond 50' such that settling basin insert 10 abuts settling pond 50' on one side and abuts land, for example an access road 60, on the opposing side. FIG. 3 illustrates a cross-sectional view of settling basin insert 10 along lines III-III of FIG. 2.

Figure 13:
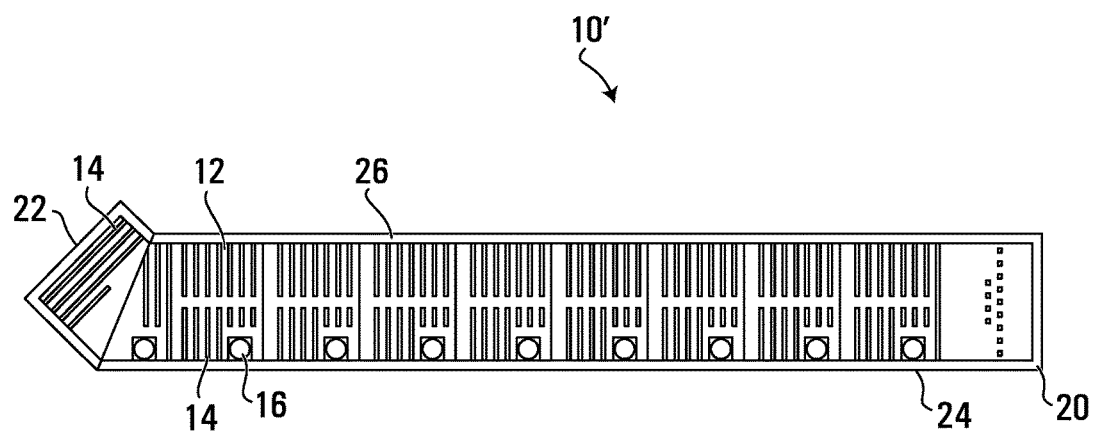
FIG. 13 is a top plan view of a settling basin insert, according to an embodiment.

Settling basin insert 10 has a head 20 and an end 22, and may be formed in a straight line, as shown in FIGS. 2 and 3, or bend at various points, as shown for example in FIG. 13, depicting a settling basin insert 10' having a bend of 135 degrees.

Settling basin insert 10 may be, for example, between 3 m and 60 m in length from head 20 to end 22.

An inlet 40' directs inflowing fluid to settling basin insert 10. Inlet 40' may be a cylindrical pipe with an opening generally circular in cross-section, as depicted for example in FIGS. 2 and 3. Inlet 40', as depicted in FIGS. 2 and 3, may run horizontally parallel to settling basin insert 10 and deposit inflowing fluid at head 20 of settling basin insert 10 above the level of a sump 38 of settling basin insert 10, discussed in further detail below. The size of the opening of inlet 40' through which fluid flows into settling basin insert 10 may vary, as well as the angle from horizontal of inlet 40', to affect the flow rate and direction of inflowing fluid to settling basin insert 10, and the location at which inflowing fluid enters settling basin insert 10. For example, in some embodiments, a larger or flanged opening of inlet 40' may allow for a larger volume of flow to exit inlet 40' to settling basin insert 10. In some embodiments, the opening of inlet 40' may be other shapes in cross-section, such as generally oval or generally rectangular. In some embodiments, a steeper angle of inlet 40' from horizontal may result in accelerated flow, and a shallower angle of inlet 40' may result in decelerated flow as inflowing fluid enters settling basin 10. In some embodiments, inlet 40' may have a bend, for example between zero and 90 degrees, preferably 45 degrees, upstream from where inlet 40' meets settling basin insert 10, which may provide a tortuous flow path to decelerate or divert fluid flow before reaching settling basin insert 10. In some embodiments, inlet 40' may include protrusions to decelerate or divert flow before reaching settling basin insert 10.

An outlet for fluid displaced out of settling pond 50' is omitted from FIG. 2.

Some or all fluid flowing into pond 50' may flow along settling basin insert 10 before entering pond 50'. Settling basin insert 10 directs inflowing fluid from inlet 40' through a flow path to decelerate the flow and aid settling and retention of sediment.

Settling basin insert 10 includes a first side wall, land-side wall 34, and a second side wall, pond-side wall 36, and may include a base 32, as can be seen in FIGS. 4 to 8. FIGS. 4 to 8 also illustrate a settling basin insert section 11, a number of which can be placed along the length of settling basin insert 10, to define settling basin insert 10.

Settling basin insert 10 may be between 1200 mm and 3600 mm in width, from land-side wall 34 to pond-side wall 36.

Figure 4:
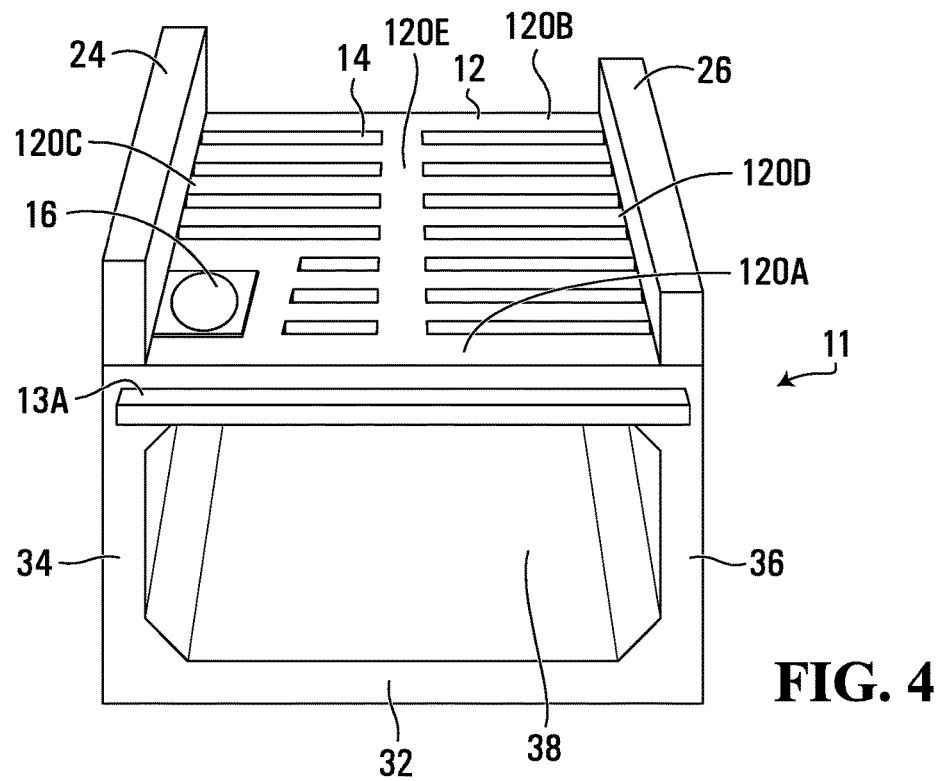
FIG. 4 is a front perspective view of a section of the settling basin insert of FIG. 2.
Figure 5:
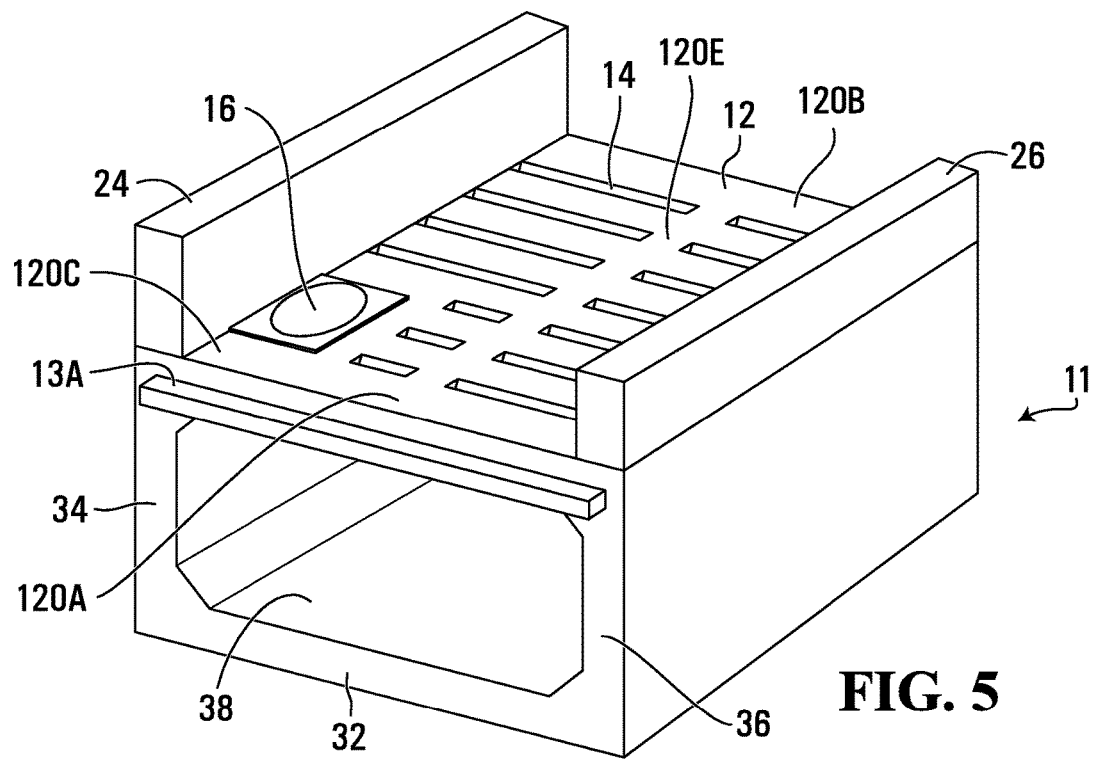
FIG. 5 is a perspective view of the settling basin insert section of FIG. 4, rotated 45 degrees.
Figure 8:
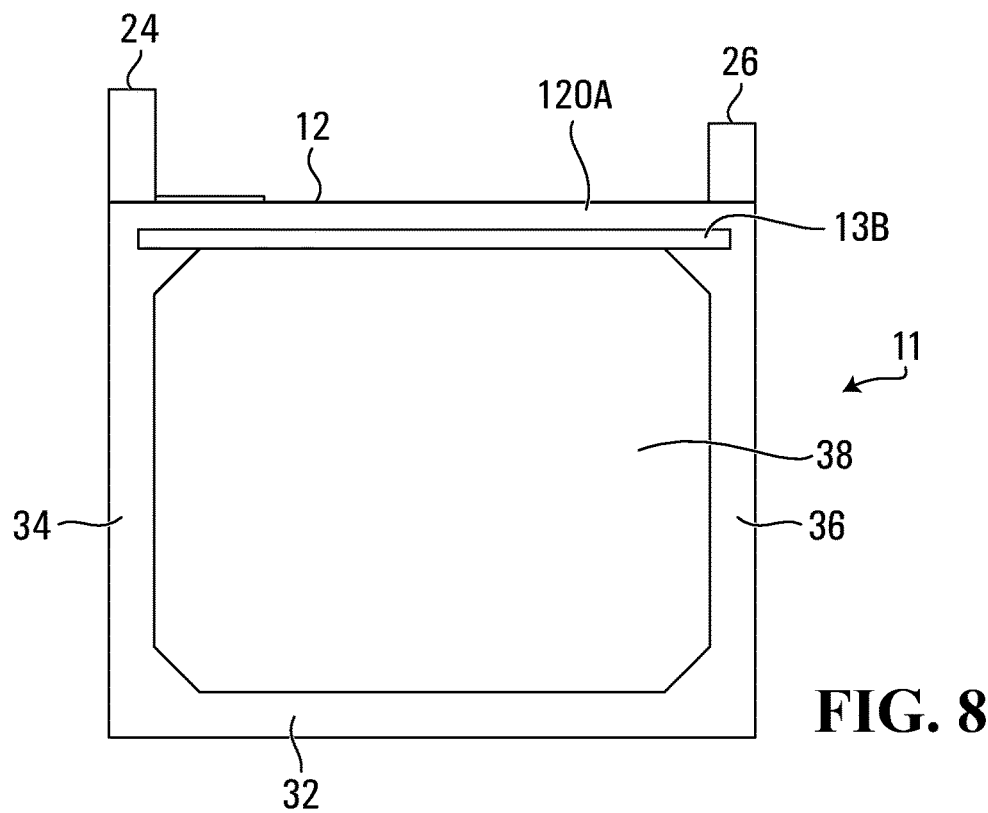
FIG. 8 is a rear elevation view of the settling basin insert section of FIG. 4.

Each of land-side wall 34 and pond-side wall 36 may intersect with base 32 at a chamfered edge, as shown in FIGS. 4, 5 and 8, or at a right-angled edge with one or both of land-side wall 34 and pond-side wall 36 intersecting base 32 at 90 degrees. Land-side wall 34, pond-side wall 36 and base 32 may be formed, for example, from concrete, such as precast concrete box culverts, metal, fiberglass, wood or plastic.

Along the length of settling basin insert 10, a top surface, for example a plurality of grates 12, are positioned over the open top between land-side wall 34 and pond-side wall 36, defining sump 38. Sump 38 may collect fluid and sediment that flows into settling basin insert 10, as discussed in further detail below. Each settling basin insert section 11 may have a corresponding grate 12.

Grate 12 has a head-side 120A, defined as a side of grate 12 that is generally adjacent a position at which a fluid flow would first contact grate 12 as it flows along settling basin insert 10, an end-side 120B, defined as the opposing side of grate 12, a land-side 120C generally adjacent land-side wall 34, a pond-side 120D generally adjacent pond-side wall 36, and a centre portion 120E, generally mid-way between land-side 120C and pond-side 120D.

Grate 12 may be formed from concrete, for example, and as such, grate 12 may be formed integrally with land-side wall 34 and pond-side wall 36 as depicted in FIGS. 4, 5 and 8. Grate 12 may be, for example, 3048 mm long, 2500 mm wide and 250 mm in height at its lowest height. Grate 12 may be chamfered and flange downwardly on land-side 120C towards land-side wall 24, and flange downwardly on pond-side 120D toward pond-side wall 36, as depicted in FIGS. 4, 5 and 8. Such chamfers may offer structural support to grate 12 and settling basin insert 10 as fluid flows along and through grate 12 and settling basin insert 10.

In other embodiments, grate 12 may be formed of other materials, for example, from metal, fiberglass, wood or plastic, and formed separately and attached to land-side wall 34 and pond-side wall 36. For example, grate 12 may be formed of concrete poured as one piece, with formations at the bottom of its haunches on each side to interlock with, for example, holes or slots present on the tops of land-side wall 34 and pond-side wall 36, to attach grate 12 to land-side wall 34 and pond-side wall 36. In embodiments where one of grate 12, land-side wall 34, or pond-side wall 36 are formed of concrete, an anchor, for example a drop-in anchor, may be used as an attachment point for another of grate 12, land-side wall 34, or pond-side wall 36. Other suitable attachment techniques would be understood by a person skilled in the art.

Each grate 12 has fluid apertures 14 through which fluid can communicate and flow into sump 38, which also promotes deceleration of fluid flowing along grates 12.

As depicted, fluid apertures 14 extend across grate 12 generally perpendicular to land-side wall 34 and pond-side wall 36. However, in some embodiments, fluid apertures 14 may vary in number, size, shape and configuration on grate 12 or another top surface, for example extending generally parallel to land-side wall 34 and pond-side wall 36, or vary in cross-sectional shape, including generally circular or generally rectangular. The number, size, shape and configuration of fluid apertures 14 on grate 12 may vary based on the width of the section of settling basin insert 10.

Placement and sizing of fluid apertures 14 within grates 12 may be scaled based on the size of settling basin insert 10 and its components and conditions of inflowing fluid.

For example, in a settling basin 10 having grates 12 that are 3048 mm long and 2500 mm wide, fluid apertures 14 may be located between 200 mm and 400 mm from the head-side 120A and end-side 120B of grate 12, preferably 200 mm from head-side 120A and 400 mm from end-side 120B. Each fluid aperture 14 may be between 50 mm and 300 mm wide, where the "width" of fluid aperture 14 extends from adjacent head-side 120A to towards end-side 120B, preferably 100 mm wide. Fluid apertures 14 may be separated by a distance between 200 mm to 400 mm apart, preferably 300 mm apart. Each fluid aperture 14 may extend lengthwise across grate 12 from land-side 120C to pond-side 120D with a length preferably between 300 mm and 1500 mm. In some embodiments, a number of fluid apertures 14 may extend across grate 12 in two columns, a first column of fluid apertures 14 extending from land-side wall 34 towards centre portion 120E of grate 12, with a length, for example, of approximately 1500 mm. A number of fluid apertures 14 in the first column may be offset from land-side wall 34 by the presence of an access aperture 16, discussed in further detail below, and have a length, for example, of approximately 850 mm. A second column of fluid apertures 14 may extend from pond-side wall 36 towards centre portion 120E of grate 12 and have a length, for example, of approximately 1500 mm, as shown in FIGS. 2, 4, 5 and 6.

In other embodiments, fluid apertures 14 may extend across grate 12 from land-side wall 34 to pond-side wall 36 with a length of approximately 3048 mm. The remaining fluid apertures 14 may extend lengthwise from pond-side 120D of grate 12 towards land-side 120C of grate 12 to a point adjacent access aperture 16 having a length of approximately 2400 mm.

The dimension ranges above are provided by way of example. In some embodiments, placement and sizing of fluid apertures 14 may fall outside of the ranges provided above. The placement and sizing dimensions of fluid apertures 14 could be in different ranges, depending, for example, on the scaling appropriate for the inflowing fluid. In some embodiments, the relative proportionality of fluid apertures 14 on grate 12 may remain consistent as grate 12, section 11, or settling basin insert 10 is scaled smaller or larger, for example, depending on the flow rate and volume of inflowing fluid and the size of inlet 40'.

Figure 7:
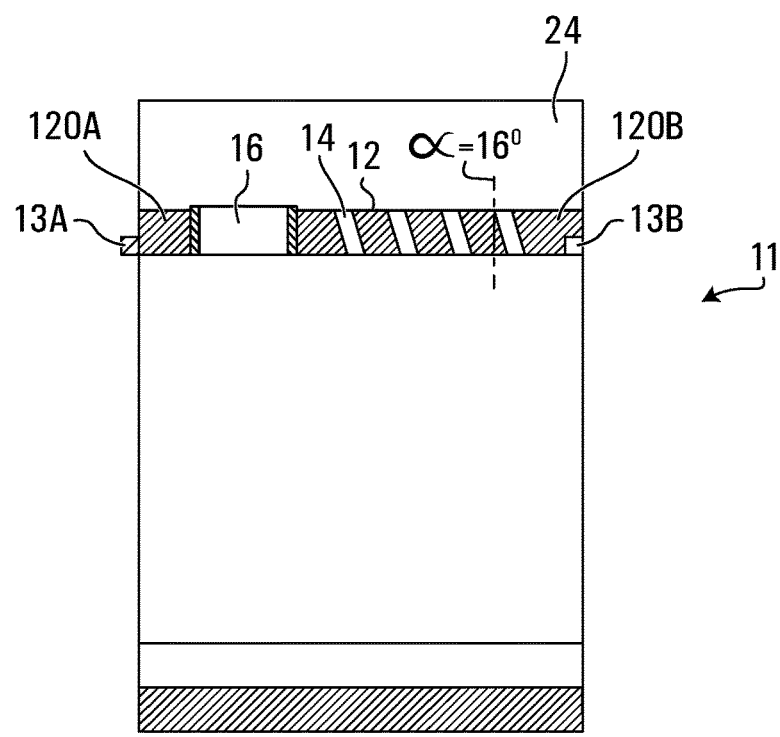
FIG. 7 is a cross-sectional view of the settling basin insert section of FIG. 4 along lines VII-VII.

Each fluid aperture 14 may be angled through the body of grate 12 at between 60 degrees and negative 60 degrees from perpendicular, for example, approximately 16 degrees from perpendicular, as depicted in FIG. 3 and in particular angle alpha ($\alpha$) as depicted in FIG. 7. FIGS. 3 and 7 depict fluid apertures 14 angled away from perpendicular towards end-side 120B. In other embodiments, fluid apertures 14 may be angled away from perpendicular towards head-side 120A.

Fluid apertures 14 angled away from perpendicular towards head-side 120A may allow for promotion of deceleration of fluid flowing along grates 12. Fluid apertures 14 angled away from perpendicular towards end-side 120B may allow for inflowing fluid and sediment to more directly communicate through fluid apertures 14 and into sump 38.

Each grate 12 also has an access aperture 16 to permit access through grate 12 to sump 38 for maintenance activities, and may, for example, be sized such that a vacuum hose is passable through access aperture 16 and into sump 38 of settling basin insert 10. Access apertures 16 may be generally closer to the land-side of settling basin insert 10 for accessibility from access road 60 by a vacuum truck, for example.

Figure 9:
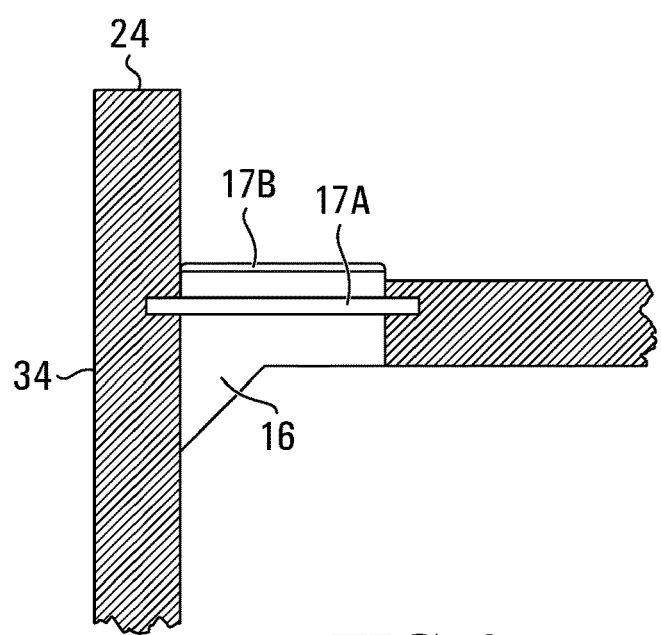
FIG. 9 is a partial cross-section view of an access aperture, according to an embodiment.

In some embodiments, access aperture 16 may include a gasket 17A as depicted in FIG. 9, defining the opening through which a vacuum hose may pass. In some embodiments, access aperture 16 may be closed with a solid cap 17B, formed for example, from solid metal, preventing fluid from flowing through access aperture 16 and into sump 38 unless solid cap 17B is removed, for example, for insertion of a vacuum hose through access aperture 16. In other embodiments, access aperture 16 may be covered by metal mesh wiring instead of a solid cap, limiting the size of particles that may travel through access aperture 16 into sump 38, while allowing fluid communication through access aperture 16.

Figure 6:
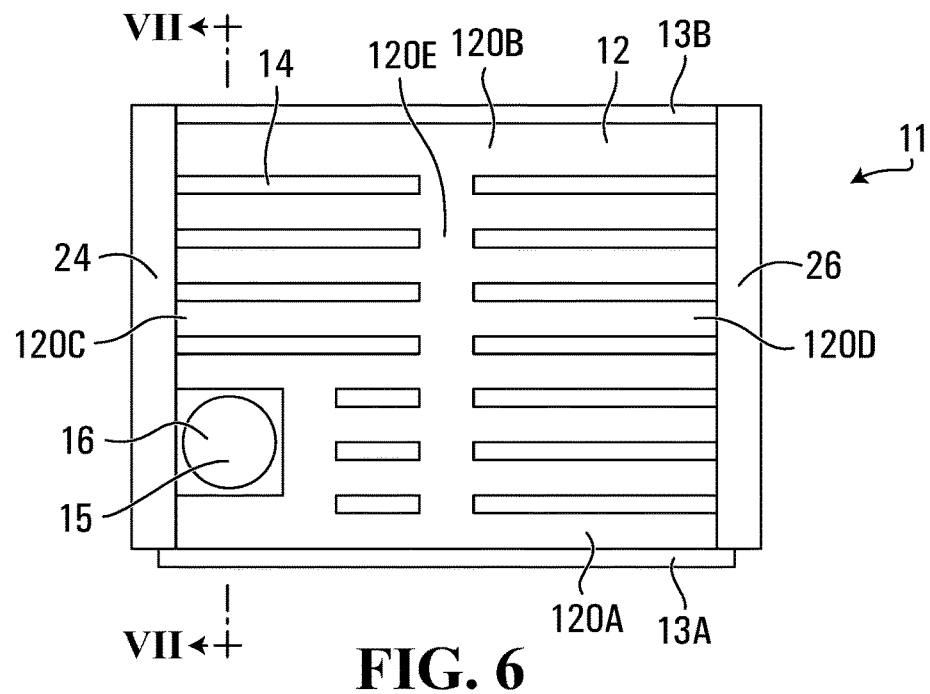
FIG. 6 is a top plan view of the settling basin insert section of FIG. 4.

Access aperture 16 may be, for example, 550 mm in diameter, and the centre of access aperture 16 may be approximately 550 mm from the edge of head-side 120A of grate 12, as depicted in FIG. 6. Access aperture 16 may be recessed within grate 12, for example, by 75 mm.

In some embodiments, access aperture 16 may be closed by a standard-sized manhole cover, known to a person skilled in the art.

Each of land-side wall 34 and pond-side wall 36 of settling basin insert 10 has a guide wall, land-side guide wall 24 and pond-side guide wall 26, respectively. Land-side guide wall 24 and pond-side guide wall 26 extend to a height above grates 12 and may span the length of settling basin insert 10. Pond-side guide wall 26 may extend, for example, between 300 mm and 900 mm, preferably 600 mm above grate 12. Land-side guide wall 24 is typically taller than pond-side guide wall 26, and may extend, for example, between 450 mm and 1200 mm, preferably 900 mm above grate 12. As depicted, land-side guide wall 24 may be formed separately and attached to land-side wall 34, or may be formed integrally with land-side wall 34. Similarly, as depicted, pond-side guide wall 26 may be formed separately and attached to pond-side wall 36, or may be formed integrally with pond-side wall 36.

Land-side guide wall 24 may be integrated into a slope of a side of settling pond 50', and may act as a retaining wall.

Land-side guide wall 24 and pond-side guide wall 26 direct fluid from inlet 40' along the length of settling basin insert 10.

As depicted, pond-side guide wall 26 is lower in height than land-side guide wall 24 such that, in cases of large or very high-velocity fluid flows, fluid may remain directed and retained by land-side guide wall 24, but flow over pond-side guide wall 26 and into settling pond 50' without entering sump 38 or stirring up sediment in sump 38.

In some embodiments, in a section 11, sump 38 may be open at both ends. In some embodiments, sump 38 is closed by a vertical wall on one or both ends of a section 11.

Each section 11 may have a protruding tongue 13A at its front and a recessed bell 13B at its end that form an interlock between adjacent sections 11. In other embodiments, protruding tongue 13A and recessed bell 13B may be omitted.

A precast concrete box culvert used to form a section 11 may be a nominally 3000 mm×2400 mm box culvert, with sump 38 having inner dimensions of 3048 mm in width and 2438 mm in height, and each of land-side wall 34 and pond-side wall 26 may have a height of 2500 mm. In some embodiments, a nominally 3000 mm×1800 mm box culvert may be used to form a section 11. In some embodiments, section 11 may vary further in size, for example, from a nominally 1200 mm×1200 mm box culvert up to 3600 mm×3048 mm box culvert.

In some embodiments, multiple sections 11 may be interlocked together, for example using protruding tongue 13A and recessed bell 13B of adjacent sections 11. Seams 110 between adjacent sections 11 are depicted in FIG. 3.

Sectioning settling basin insert 10 into sections 11 may allow settling basin insert 10 to be more easily transported, moved and installed. Sections 11 may further allow for settling basin 10 to be customized to a chosen length based on design considerations such as the size of settling pond 50', location of access road 60, and flow rate and volume of inflowing fluid.

As illustrated in FIGS. 2 and 3, parts of settling basin insert 10 may differ from sections 11 at head 20 and end 22, as described in further detail below.

At head 20 of settling basin insert 10, a top plate 18 may cover a top section of settling basin insert 10 and sump 38, and include flow dispersion protrusions 19 extending upwardly from top plate 18. Inflowing fluid from inlet 40' flows over top plate 18 and flow dispersion protrusions 19 promote deceleration of fluid flowing over top plate 18. Top plate 18 may be solid, and in some embodiments, top plate 18 may also have a roughened or perforated surface to increase friction, thus further promoting deceleration of fluid flowing over top plate 18. In still other embodiments, top plate 18 may be omitted.

Each of head 20 and end 22 of settling basin insert 10 may be closed by a vertical plate, by way of a head cap 21 at head 22 of settling basin insert 10, and an end plug 23 at end 22 of settling basin insert 10, as shown in FIG. 3. As depicted, head cap 21 and end plug 23 each contact land-side wall 34, pond-side wall 36 and base 32, thereby closing off each end of sump 38. In other embodiments, head cap 21 and end plug 23 may extend into contact with pond-side guide wall 26 or land-side guide wall 24. In some embodiments, these vertical plates may be solid, and may, for example, be formed from concrete, metal, fiberglass, wood or plastic. In still other embodiments, head cap 21 and end plug 23 may be omitted.

Figure 10:
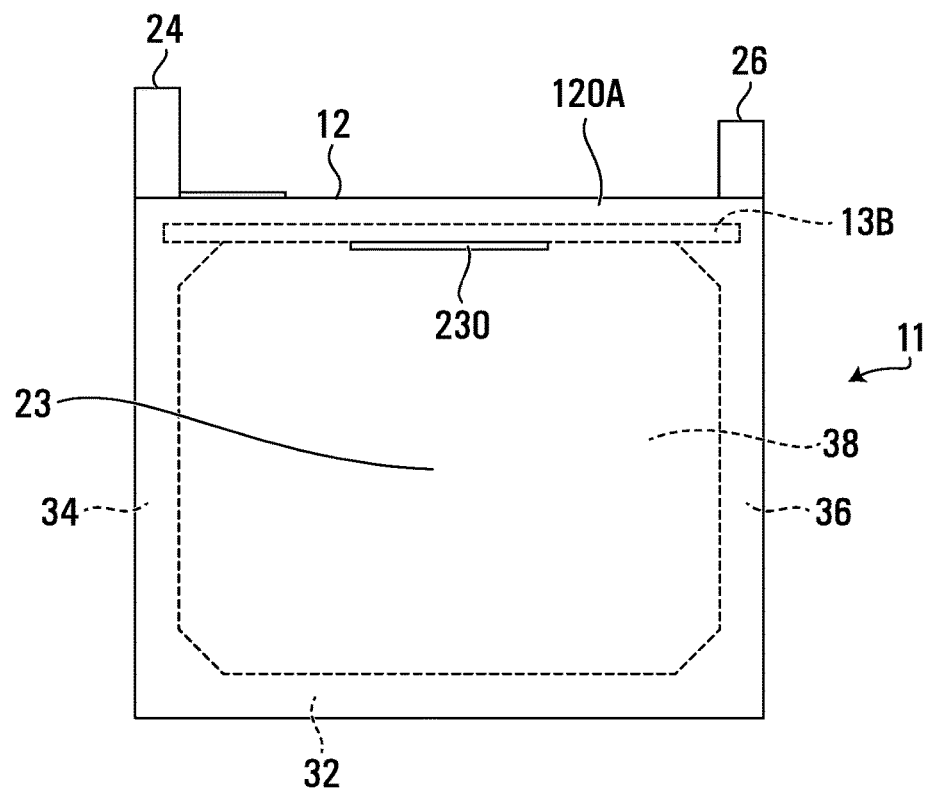
FIG. 10 is a rear elevation view of an end plug of the settling basin insert of FIGS. 2 and 3.

As illustrated in FIG. 10, in some embodiments, end plug 23 may have a drain aperture 230 to allow fluid to drain through from sump 38. In some embodiments, drain aperture 230 may be adjacent the top of end plug 23 and the top of drain aperture 230 may be level with the bottom of grates 12. Drain aperture 230 may have a length of between 300 mm and 2400 mm, preferably 1000 mm, and a height of between 50 mm and 300 mm, preferably 100 mm.

As illustrated in FIGS. 2 and 3, in some embodiments, absorbent socks 80 may be placed at intervals along settling basin insert 10 to absorb a liquid such as oil or petroleum products that may be present in inflowing fluid. Absorbent socks 80 may act as oil traps to absorb and retain oils and petroleum-based liquids without absorbing or retaining water, for example, by containing a hydrophobic material. Absorbent socks 80 may be placed at or adjacent to end-side 120B of one or more grates 12, as shown in FIGS. 2 and 3, and may be tied down to grate 12 for attachment (not shown).

In some embodiments, each absorbent sock 80 may be generally cylindrical and have an approximate diameter between 35 mm and 150 mm, preferably approximately 75 mm, and may extend across the length of grate 12 at a length, for example, of 3048 mm. In some embodiments, a skin of absorbent sock 80 may be formed of a suitable material such as polypropylene to contain a filler material and allow fluid to pass through to the filler material. Filler material may also be formed of polypropylene, or a suitable absorbent material such as cellulose. Other materials and configurations suitable for oil or petroleum capture or spill response would be apparent to a person skilled in the art.

As illustrated in FIG. 3, in some embodiments, a baffle 82 may extend downwards from a grate 12 into sump 38. Baffle 82 may be a solid plate or contain fluid apertures, and may extend across the length of grate 12. Components of fluid in sump 38 that are more buoyant, for example, oil droplets, may rise within the fluid and become trapped behind baffle 82, and the remaining fluid may pass under baffle 82, free to flow along the length of sump 38 in settling basin insert 10.

As illustrated in FIGS. 2 and 3, in some embodiments, settling basin insert 10 may include, beyond end 22, a retaining wall, for example a wing wall 90. Wing wall 90 may continue beyond end 22 of settling basin insert 10 from land-side wall 34. The base of wing wall 90 may be level with base 32 and the top of wing wall 90 may be level with land-side guide wall 24, or extend above land-side guide wall 24. The height from base to top of wing wall 90 may be 4548 mm. Wing wall 90, as shown in FIGS. 2 and 3, may have buttresses 92 that project perpendicularly from wing wall 90 to provide support to wing wall 90. Wing wall 90 may be at an angle, for example 45 degrees, from end 22 of settling basin insert 10, as shown in FIG. 2.

The dimensions of settling basin insert 10, and its component parts, may be scaled smaller or larger, for example, depending on the flow rate and volume of inflowing fluid and the size of inlet 40', or an amount of area upstream draining to settling basin insert 10 via inlet 40'.

Figure 11:
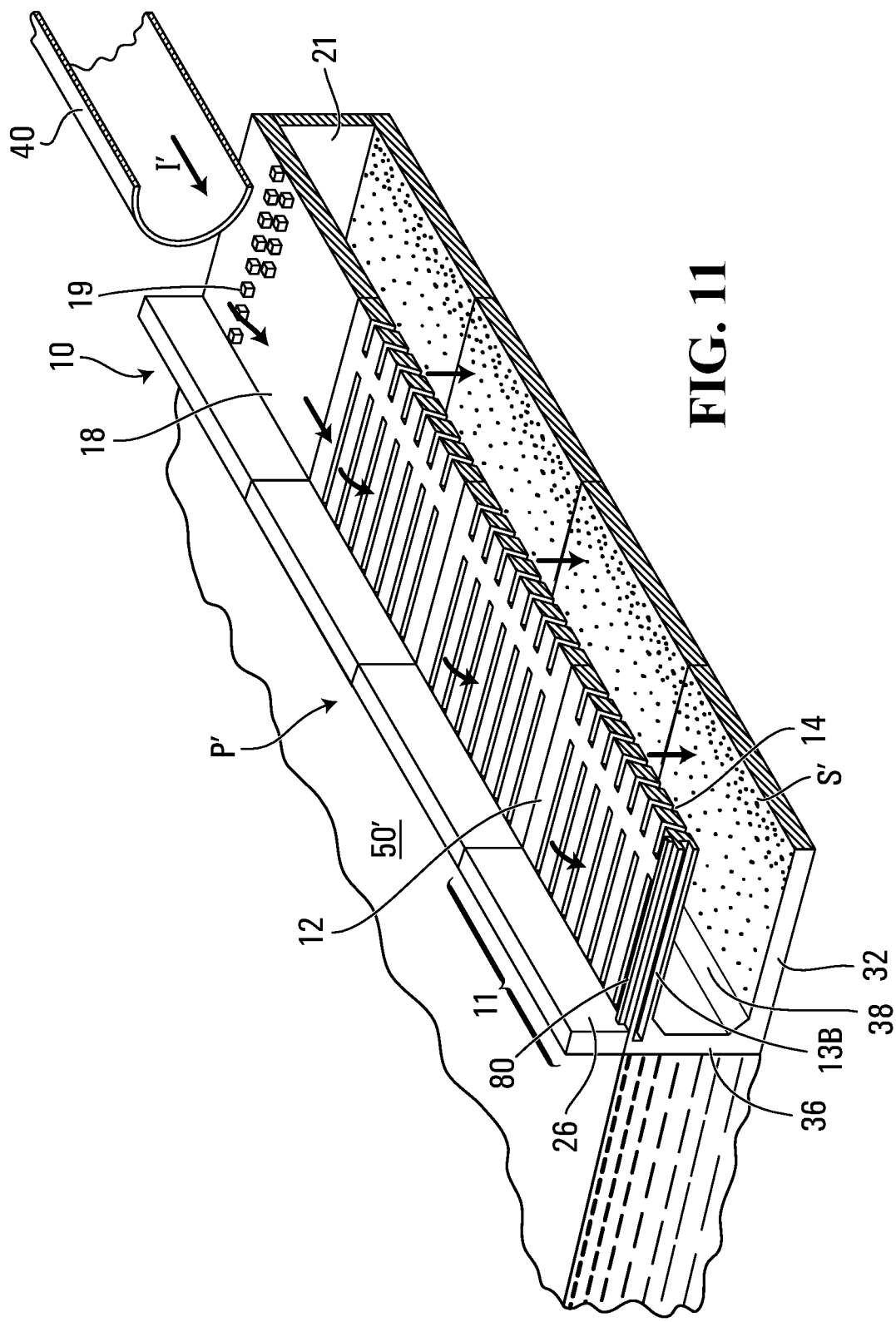
FIG. 11 is a cross-sectional view of a first fluid flow path along the settling basin insert of FIG. 2 along lines III-III and lines X-X.

FIG. 11 depicts a cross-section view of settling pond 50' with settling basin insert 10 installed, along lines III-III and lines X-X of FIG. 2. Arrows I' denote a primary example first path of fluid over and along settling basin insert 10, typical of small flows.

In use, the settling basin insert 10 remains full of fluid below grates 12 and top plate 18, with grates 12 and top plate 18 being located approximately at the permanent water level of settling pond 50'.

In embodiments of settling basin insert 10 having end plug 23 with drain aperture 230, the permanent water level of settling pond 50' may align with the level of fluid within sump 38 at a level below drain aperture 230 during typical small flows of inflowing fluid. The standing level of fluid in sump 38 may be, for example, 350 mm below the top of grates 12.

Fluid flows towards head 20 of settling basin insert 10 from inlet 40'. Inlet 40' is positioned level with or just above top plate 18. The incoming fluid flows over top plate 18 and among flow dispersion protrusions 19, and energy is lost, thus promoting deceleration of fluid flowing over top plate 18.

Land-side guide wall 24 and pond-side guide wall 26 may direct incoming fluid along the length of settling basin insert 10. Fluid may communicate between grate 12 and sump 38 through fluid apertures 14. Solid particles in the incoming fluid flow settle through grates 12 as sediment S' into sump 38. Energy is dissipated as the direction of fluid flow is changed as streams of fluid travel through fluid apertures 14, and energy is lost to friction as fluid flows along grates 12.

Furthermore, fluid flowing along settling basin insert 10 may contact absorbent socks 80, which may act as oil traps to absorb and retain oils and petroleum-based liquids without absorbing or retaining water in the fluid.

Fluid flowing along settling basin insert 10 through sump 38 may contact baffle 82 and baffle 82 may trap buoyant particles, for example oil droplets, from the fluid.

As a result, fluid flowing along and through settling basin insert 10, as well as into sump 38, is likely to have a relatively low velocity. Thus more solid particles may settle into sump 38 before the fluid flow reaches pond 50'.

As noted, fluid flowing into pond 50' with high velocity may cause churning of the pool P' and mixing of dirt and sediment. Mixed dirt and sediment may then be carried out of pond 50' by fluid flowing out through an outlet (not shown). Conversely, fluid that flows into pond 50' at low velocity may be less likely to cause churning in pool P' and mixing of dirt and sediment, which may ultimately reduce the amount of dirt and sediment carried out of pond 50' by outflowing fluid.

Furthermore, fluid that flows into pond 50' with less solid particles may reduce the amount of dirt and sediment that enters pond 50'.

In certain circumstances, the flow rate of inflowing fluid may be much higher than normal. Such circumstances may occur, for example, in the case of a storm event or periods of heavy rainfall intensity.

Figure 12:
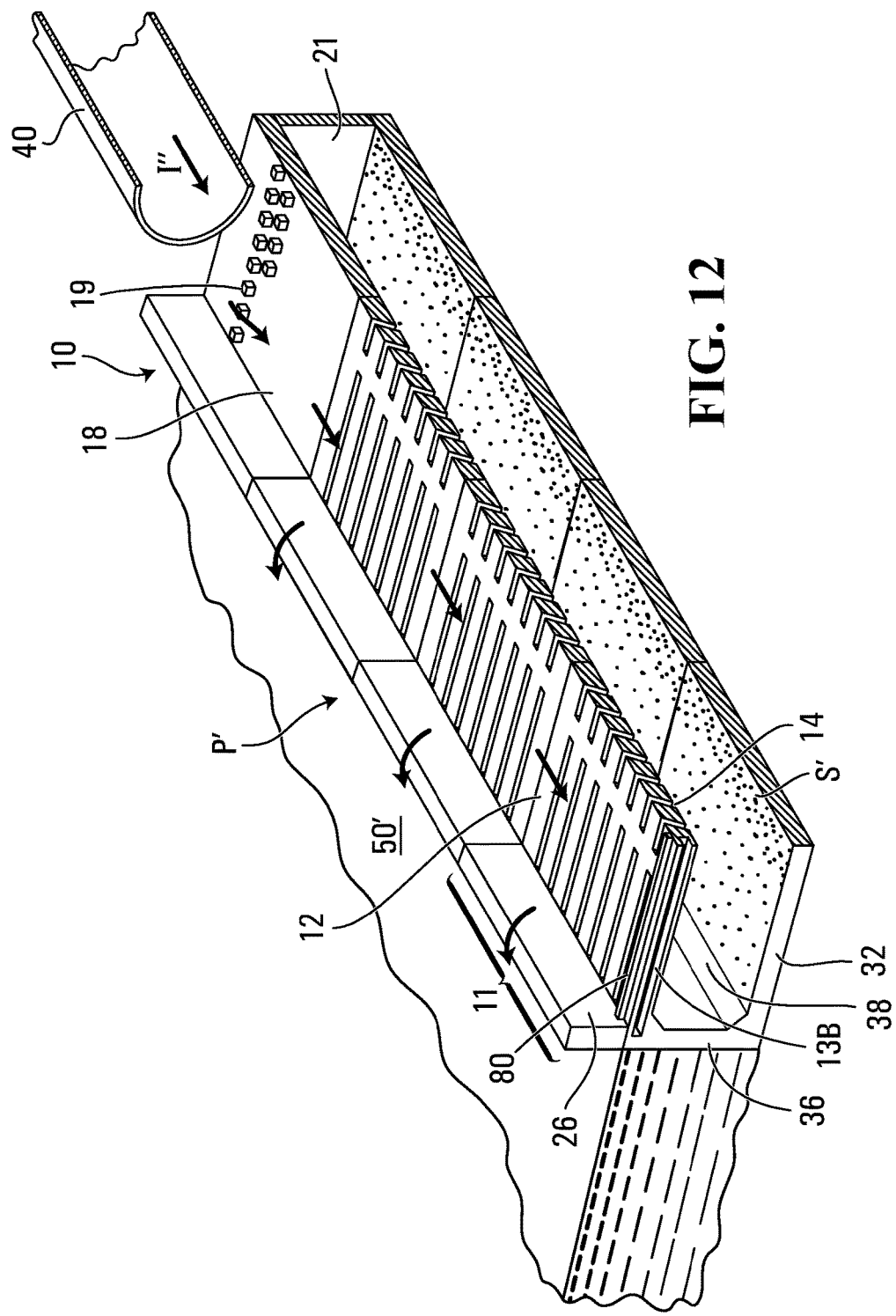
FIG. 12 is a cross-sectional view of a second fluid flow path along the settling basin insert of FIG. 2 along lines III-III and lines X-X.

FIG. 12 again depicts a cross-section view of pond 50' with settling basin insert 10, along lines III-III and lines X-X of FIG. 2. Arrows I" denote a secondary example path of fluid over and along settling basin insert 10, typical of large or very high-velocity flows.

As is the case with small flows, some inflowing fluid lands on top plate 18 and among flow protrusions 19, and is directed along the length of settling basin insert 10 by land-side guide wall 24 and pond-side guide wall 26. Fluid then passes along grates 12.

Large or very fast fluid flows tend to rush across grates 12, with relatively little fluid communicating through fluid apertures 14. In effect, grates 12 at least partially separate the fast-flowing incoming fluid of a large flow from the relatively still fluid previously accumulated in sump 38. As will be apparent, this limits mixing of the inflowing fluid with the fluid in sump 38, and likewise limits churning of sump 38 fluid. Accordingly, separating large flows from fluid in sump 38 may reduce the likelihood of sediment S' in sump 38 being mixed with the flows carried out of settling basin insert 10 and into pond 50'.

Furthermore, the height of pond-side guide wall 26 allows for such a large flow to flow directly over pond-side guide wall 26 and into pond 50, while land-side guide wall 24 continues to direct the large flow over grates 12 along the length of settling basin insert 10.

Grates 12 effectively define a barrier over sump 38. Small, slow flows may be permitted to enter sump 38 through fluid apertures 14 for settling and retention of sediment, while flows that are too large or too fast for effective settling may be practically or fully segregated from fluid in sump 38. Instead, large flows may be conveyed into pond 50' over pond-side guide wall 26 so that scour or churn of previously-captured sediment S' is avoided and such sediment is retained in sump 38.

Furthermore, at end 22 of settling basin insert 10, drain aperture 230 of end plug 23, as shown in FIG. 10, may allow for capacity in sump 38 of the height of drain aperture 230 below grate 12. For example, if drain aperture 230 extends 50 mm below grate 12, a permanent standing level of fluid inside sump 38 may be 50 mm or more below the bottom of grate 12, and the top 50 mm of sump 38, may be available to receive inflowing fluid from a first flush from a storm event, which may increase capture of sediment S' in sump 38. If sump 38 is filled with fluid up to the top 50 mm of sump 38, inflowing fluid will fill to the top of grate 12 and flow across the top of grate 12, as discussed above.

Fluid that exits settling basin insert 10 at end 22 may contact and be directed by wing wall 90 towards the body of pond 50'. Wing wall 90 may prevent such fluid flow from eroding slopes of pond 50'.

Sediment S' collected in sump 38 may be collected in a smaller area to be periodically cleaned by a vacuum truck with a vacuum hose entering sump 38 through an opened access aperture 16, instead of draining the whole pond containing sediment spread over a larger area as in a traditional maintenance method. Fluid in sump 38 may be pumped directly into pond 50', for example, using a pump to dewater settling basin insert 10, leaving sediment S' in sump 38 to be vacuumed out and disposed of.

Settling basin insert 10 may reduce the disruption of existing water in sump 38 to avoid settled sediment S' at the bottom sump 38 from mixing with and becoming entrained in the water flowing into settling pond 50', particularly in cases of high water flow. This may allow for a higher inflow rate in use.

Furthermore, the presence of grates 12 may prevent fluid in sump 38 of settling basin insert 10 from being in direct sunlight, and as such fluid in sump 38 may be cooler than the fluid in pool P' in pond 50', which may have beneficial effects on the surrounding ecosystem.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A settling basin insert for controlling fluid flow into a settling basin, the settling basin insert comprising:
    a first side wall and a second side wall in opposition, and a top surface extending between the first side wall and the second side wall, the first side wall, the second side wall and the top surface defining a sump extending from a head to an end; and
    a plurality of fluid apertures extending through the top surface to permit fluid to communicate with the sump therethrough and an access aperture in the top surface to permit a vacuum hose to pass into the sump;
    wherein the first side wall is taller than the second side wall, and the first side wall and the second side wall each define a guide wall extending above the top surface, and the second side wall is configured to be adjacent the settling basin.

2. The settling basin insert of claim 1, wherein the top surface comprises a plurality of grates.

3. The settling basin insert of claim 1, wherein the plurality of fluid apertures extend laterally between the first side wall and the second side wall.

4. The settling basin insert of claim 1, further comprising:
    a top plate extending between the first side wall and the second side wall, adjacent the head of the sump; and a plurality of protrusions extending upwardly from the top plate.

5. The settling basin insert of claim 4, wherein the top plate is solid.

6. The settling basin insert of claim 1, further comprising:
a head plate closing the head of the sump; and
an end plate closing the end of the sump.

7. The settling basin insert of claim 6, wherein the end plate comprises a drain aperture to permit fluid to communicate between the sump and the settling basin.

8. The settling basin insert of claim 1, wherein the first side wall is adjacent land.

9. The settling basin insert of claim 1, wherein the top surface is located at approximately a permanent water level of the settling basin.

10. The settling basin insert of claim 1, wherein the access aperture is adjacent the first side wall.

11. A method of controlling fluid flow into a settling basin, comprising:

directing fluid towards a head of a settling basin insert at approximately a permanent water level of the settling basin;

directing fluid over flow dispersion protrusions, thereby decelerating the fluid;

diverting fluid from passing into the settling basin by directing fluid along the settling basin insert by a first guide wall adjacent the settling basin and extending above approximately the permanent water level of the settling basin, and an opposing second guide wall adjacent land and extending above approximately the permanent water level of the settling basin to a height greater than a height of the first guide wall; and directing fluid through apertures along a surface of the settling basin insert to further decelerate the fluid for settling of sediment in the settling basin insert.

* * * * *